US008448251B2

United States Patent
Harris et al.

(10) Patent No.: US 8,448,251 B2
(45) Date of Patent: May 21, 2013

(54) METHOD AND APPARATUS FOR PROCESSING AND DISPLAYING SECURE AND NON-SECURE DATA

(75) Inventors: Peter William Harris, Cambridge (GB); David Paul Martin, Cambridge (GB)

(73) Assignee: ARM Limited, Cambridge (GB)

( * ) Notice: Subject to any disclaimer, the term of this patent is extended or adjusted under 35 U.S.C. 154(b) by 1057 days.

(21) Appl. No.: 12/382,871

(22) Filed: Mar. 25, 2009

(65) Prior Publication Data

US 2009/0254986 A1    Oct. 8, 2009

(30) Foreign Application Priority Data

Apr. 8, 2008 (GB) .................................. 0806365.3

(51) Int. Cl.
*G06F 17/30* (2006.01)
(52) U.S. Cl.
USPC .......................................................... 726/26
(58) Field of Classification Search
None
See application file for complete search history.

(56) References Cited

U.S. PATENT DOCUMENTS

| | | | |
|---|---|---|---|
| 7,269,846 B2 * | 9/2007 | Chennakeshu et al. ............ | 726/4 |
| 7,647,557 B2 * | 1/2010 | Janus ............................ | 715/723 |
| 7,716,720 B1 * | 5/2010 | Marek et al. ...................... | 726/2 |
| 7,904,730 B2 * | 3/2011 | Proudler et al. ................ | 713/189 |
| 2003/0065864 A1 * | 4/2003 | Hollinger ...................... | 710/305 |
| 2003/0204747 A1 * | 10/2003 | Gaebel et al. ................... | 713/201 |
| 2006/0021031 A1 * | 1/2006 | Leahy et al. ..................... | 726/22 |
| 2006/0253705 A1 | 11/2006 | Roberts et al. | |
| 2006/0253706 A1 | 11/2006 | Roberts et al. | |
| 2006/0288274 A1 | 12/2006 | Bustelo et al. | |

FOREIGN PATENT DOCUMENTS

GB    2 406 403    3/2005

OTHER PUBLICATIONS

Search Report for UK 0806365.3 dated Jul. 25, 2008.

* cited by examiner

*Primary Examiner* — Peter Poltorak
(74) *Attorney, Agent, or Firm* — Nixon & Vanderhye P.C.

(57) ABSTRACT

A data processing apparatus is disclosed that comprises: at least one processor; a display for displaying data processed by said at least one processor; at least one display buffer for storing an array of display elements for subsequent output to said display, said display elements being secure display elements for displaying secure data and non-secure display elements; and a user interface; wherein said at least one processor is operable to execute at least one untrusted process and at least one secure process, said at least one secure process having access to secure data; said data processing apparatus further comprising: a secure user input for receiving a user input, said received user input not being accessible to said at least one untrusted process; and said data processing apparatus being responsive to an input received at said secure user input to transform data to be displayed on said display such that said secure display elements and said non-secure display elements are transformed differently to each other.

25 Claims, 6 Drawing Sheets

METHOD AND APPARATUS FOR PROCESSING AND DISPLAYING SECURE AND NON-SECURE DATA

This application claims priority to GB Application No. 0806365.3 filed 8 Apr. 2008, the entire contents of which is incorporated herein by reference.

FIELD OF THE INVENTION

The present invention relates to the field of data processing and in particular, to processing and displaying secure and non-secure data.

DESCRIPTION OF THE PRIOR ART

Data processing apparatuses that are able to process both secure, trusted, processes and untrusted processes are well known. Furthermore, displays that can support mixed security of pixel data whereby both secure and non-secure data can be displayed are also known. However, in these conventional devices it is not always easy for a user to know whether data that is being displayed has been generated by a secure process and therefore can be trusted, or whether it may have been generated by an untrusted process and may therefore have either been modified by an attacker, or is attempting to impersonate a trusted process.

Some devices have addressed this problem by providing separate secure displays that only display secure data. However, this is clearly expensive from a hardware point of view and presents a poor user experience. On devices which support mixed security of pixel data on a single display, security indicators such as a picture of a padlock have been used to indicate that the data that is being displayed is secure. This approach is both non intuitative and easy to spoof. In general, most users will not know how to actually check that the security behind the padlock is real; and even then the check can be faked if the untrusted process has compromised the system thoroughly enough. A untrusted process that is trying to give the user the impression that it is secure might generate a picture of a padlock and display it on screen for example.

A display that is required to display both secure and non-secure data simultaneously will be referred to herein as a "securable display". GB-A-2,406,403 provides an improved system for handling the generation of display data for a securable display, which provides two separate display buffers, a first display buffer being a non-secure buffer arranged to receive non-secure data produced by a non-secure process, and a second display buffer being a secure buffer operable to receive secure data produced by a secure process. The secure buffer is arranged so that it is not accessible by the non-secure process. A display controller is then provided that is arranged to read the non-secure data from the non-secure buffer and the secure data from the secure buffer, this display controller having merging logic which merges the non-secure data and the secure data in order to produce a combined data stream from which an output to the securable display is derived. Such a system has the benefit that it is easy to implement, and can provide an effective mechanism for protecting the integrity and confidentiality of the secure data. An alternative implementation to implementing secure pixels which uses less memory might use a single framebuffer which stores information about the pixel security state along with the pixel graphical information, accesses to the framebuffer could be policed according to the security state of the process making the access. Such a system is described in UK application 0700068.

While the above designs allow the system to separate pixel data between secure and untrusted processes, the data is displayed to a homogenous fashion—all pixels on the screen appear identical as far as the user is concerned, irrespective of security state. Although a trusted screen region may exist, and may be unmodifiable by an untrusted process, unless you can inform the user of this in a manner which is intuitive and cannot be spoofed the security value to the user is significantly diminished. It would be desirable to provide a system that could display secure data to a user in a way that was difficult to spoof and that was easy for a user to recognise.

SUMMARY OF THE INVENTION

Viewed from a first aspect, the present invention provides a data processing apparatus comprising: at least one processor; a display for displaying data processed by said at least one processor; at least one display buffer for storing an array of display elements for subsequent output to said display, said display elements being secure display elements for displaying secure data and non-secure display elements; and a user interface; wherein said at least one processor is operable to execute at least one untrusted process and at least one secure process, said at least one secure process having access to secure data; said data processing apparatus further comprising: a secure user input for receiving a user input, said received user input not being accessible to said at least one untrusted process; and said data processing apparatus being responsive to an input received at said secure user input to transform data to be displayed on said display such that said secure display elements and said non-secure display elements are transformed differently to each other.

The present invention recognises that although displays are available that provide mixed security pixels such that secure data that is displayed in secure pixels cannot be accessed by untrusted processes, they generally do not provide a convenient way for the user to recognise which of the information that is displayed is secure and which is not secure. Thus if, for example, the screen were to show a request to input a pin number in a communication with a bank, it would be difficult for a user to know if this data was indeed secure data or untrusted data from an application attempting to steal the user's pin number. Thus, although the hardware can display this information securely, it can be easily spoofed and thus, the security as far as a user is not directly useful.

The present invention addresses this problem by providing a secure user input that is not accessible to the untrusted process, and enables a user to request that the display is modified in some way such that the secure data and the non-secure data are visually differentiated from each other. This enables the user to identify whether the data is indeed secure or whether an untrusted process has produced it. The provision of this transformation of the display in response to a user input makes it very difficult to spoof; particularly as the user input is not accessible to an untrusted process.

In some embodiments, said secure data is data that said at least one secure process has access to and that said at least one untrusted process cannot modify.

Secure data can be defined in a number of ways and provided that the processor consistently defines it in a certain way and the security of the display elements are generated accordingly, then each way can be supported by embodiments of the present invention. Thus, secure data may be data that the untrusted process cannot modify. Alternatively, it may be data that the untrusted process cannot access. Alternatively, it could simply be data that is generated by the secure process.

In some embodiments, each of said display elements comprise a security permission indication associated therewith identifying whether that display element is a secure display element or a non-secure display element; said data processing apparatus further comprising: display logic associated with said display buffer for receiving display requests from said secure and untrusted processes, said display logic being operable to determine and where appropriate modify said security permission indication associated with a display element currently stored at a location indicated by said received display requests in dependence upon said received display requests.

One way of providing a screen operable to display mixed security data is to have display elements that have security permission indicators associated with them. These can be managed by display logic that sets the security indicators and stores the data in the relevant position in the array. These security indicators mean that each pixel that is displayed has a security status associated with it. Thus, information as to which element is displaying secure data and which non-secure data is available and can be used to differently modify the elements according to their status.

In other embodiments, said data processing apparatus comprises two display buffers, a secure display buffer for storing an array of secure display elements and a non-secure display buffer for storing an array of non-secure display elements; and display logic for merging data from said two display buffers to form a frame for display on said display.

In other embodiments, rather than having security permission indicators associated with each display element, two display buffers can be used, a secure display buffer for storing an array of secure display elements and a non-secure display buffer for storing an array of non-secure display elements. This is an alternative way to store mixed security data that is to be displayed.

In some embodiments, said data processing apparatus further comprises a display controller for controlling display of data output from said at least one display buffer, said display controller being a secure device that is not responsive to untrusted processes, said display controller being responsive to said input received at said secure user input to transform display elements received from said at least one display buffer prior to displaying said display elements on said display such that said secure display elements and non-secure display elements are transformed differently to each other.

The transformation of the secure and/or non-secure data to be displayed can be performed by the display controller. This is a convenient way of doing it as the display controller is not accessible to untrusted processes and the secure user input can be routed directly to it making it secure from external inputs. Furthermore, as the display controller controls the display of the display elements, it is a simple matter for it to alter the display of some sets of the display elements in dependence upon their security status.

Although the data processing apparatus can transform the non-secure and/or secure display elements in different ways, in one embodiment said data processing apparatus is responsive to said input received at said secure input to transform said non-secure display elements and not to transform said secure display elements.

Transforming the non-secure display elements makes it quite clear to a user if the information that they are reading is actually non-secure data. This is very difficult to spoof as any untrusted data attempting to spoof a trusted application will be non-secure and hence modified by this action; informing the user that it is actually untrusted.

In some embodiments, said non-secure display elements are set to display black when the transformation of elements is enabled.

Setting the non-secure elements to be black, either by setting the colour or by setting the brightness control or by doing both, makes it very clear to a user what secure data is present. It may be desirable to be able to see the non-secure data in such cases rather than setting the non-secure data to be black it may be set to display in a darker colour than normal.

In some embodiments, said data processing apparatus is responsive to an input received at said secure user input to output said secure display buffer and not to output said non-secure display buffer.

In the case of there being two display buffers, a secure display buffer and a non-secure display buffer, one very simple way of implementing an embodiment of the invention would be to only output the data from the secure display buffer in response to the user input. This would immediately remove non-secure data from the screen and make it clear to a user whether the data they had been looking at was secure or not.

In some embodiments, in response to said input received at said secure user input said data processing apparatus denies access to said user interface to said at least one untrusted process.

In addition to changing the display in response to a secure user input, the data processing apparatus may use this input to perform other functions. For example, it may isolate all or a part of the user interface such as the keypad part of the user interface from any untrusted processes at this point, allowing the user to input a pin code or password in a manner in which it cannot be intercepted by an untrusted process.

In some embodiments, said data processing apparatus further comprises an indicator, said indicator being operable to indicate an input received at said secure user input. This indicator can be used to indicate to the user whether or not the system has received the secure user input. This would make it very clear to the user whether the display being displayed was one that has had its data transformed based on pixel security status.

In some embodiments the secure user input comprises a toggle button, an input being received at said secure user input when said button is toggled one way and not being received when it is toggled the other way. In other embodiments it may comprise a touch screen button or a voice recognition system, such that a user's spoken command will trigger the transformation of displayed secure and non-secure data elements differently to each other.

In some embodiments, rather than directly linking the secure user input to a display controller using hardware, software may be used. For example in some embodiments said data processing apparatus further comprises a secure register and polling logic for polling said secure user input, said polling logic setting a value in said secure register in response to detecting a received input, said data processing apparatus being responsive to said value in said secure register to transform data to be displayed on said display such that said secure data display elements and said non-secure display elements are transformed differently to each other.

In other embodiments, it further comprises polling logic for polling said secure user input, said polling logic being operable to transform data to be displayed on said display such that said secure data display elements and said non-secure display elements are transformed differently to each other in response to detecting a user input at said secure user input.

In some embodiments both the polling and the transformation can be performed by secure software.

In some embodiments, said at least one processor is operable in a secure domain and a non-secure domain, said at least one processor being operable such that when executing a program in a secure domain said program has access to secure data which is not accessible when said processor is operating in a non-secure domain, wherein said secure process is a process executed in said secure domain, and said untrusted process is a process executed in a non-secure domain.

In other embodiments, said at least one processor comprises a secure processor and a non-secure processor said secure processor being operable to process said at least one secure process and said non-secure processor being operable to process said at least one untrusted process.

The secure and untrusted processes can be run on a single processor that is able to segregate the processes from each other and maintain security in this way. Alternatively, it can be run on two separate processors, one being a secure processor and the other a non-secure processor.

A second aspect of the present invention provides a method of processing data comprising: processing at least one untrusted process and outputting non-secure data for display to a display buffer; processing at least one secure process and outputting data including at least some secure data for display to said display buffer; storing said data received from said at least one secure process and said at least one untrusted process in said display buffer as an array of display elements for subsequent output to a display, said display elements being secure display elements for displaying secure data and non-secure display elements for displaying non-secure data; receiving a secure user input, said received secure user input not being accessible to said at least one untrusted process; and in response to said received secure user input transforming data to be displayed on said display such that said secure data display elements and said non-secure display elements are transformed differently to each other.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
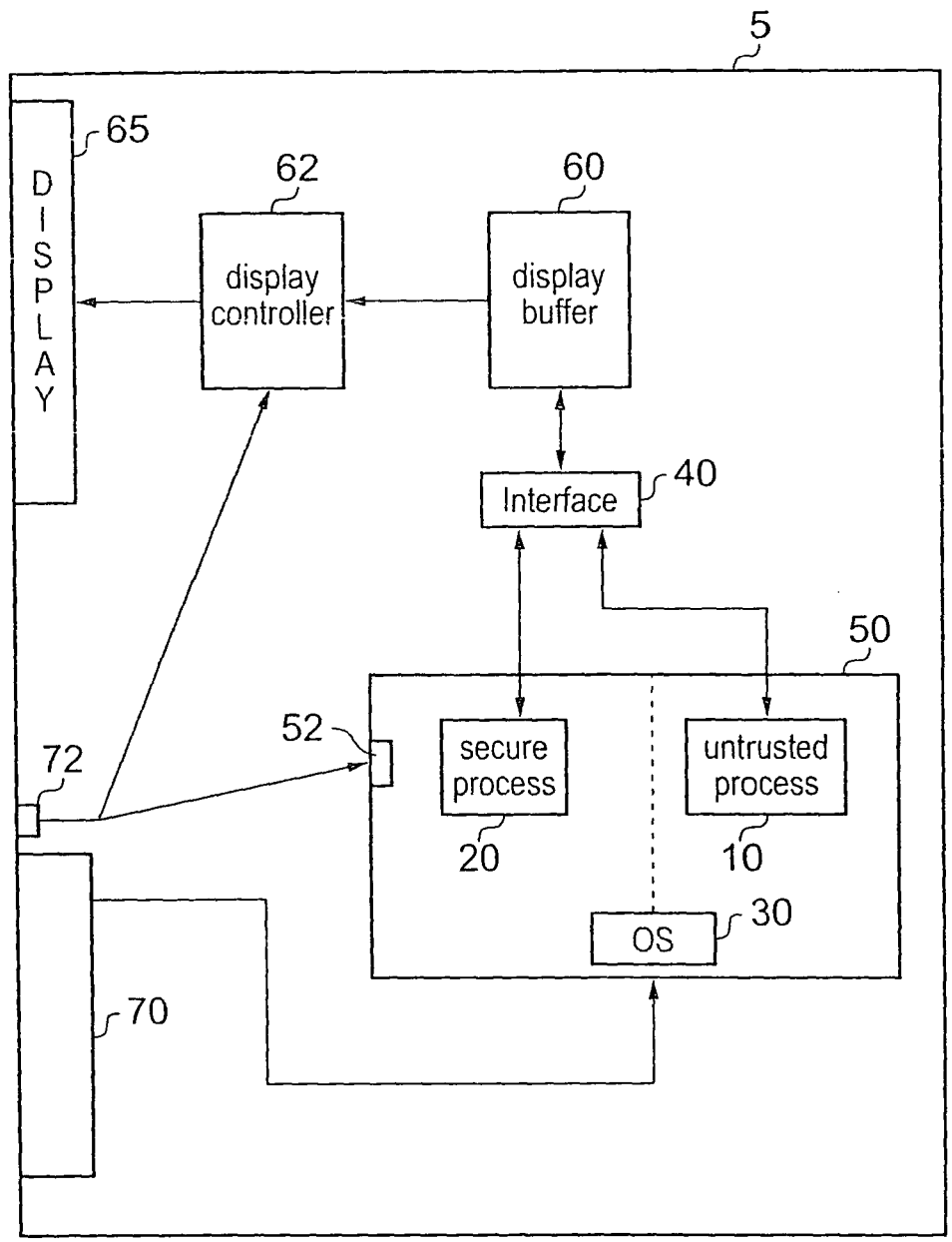
FIG. 1 shows a data processing apparatus with a single core and single display buffer according to an embodiment of the present invention.

FIG. 1 shows a data processing apparatus 5 according to an embodiment of the present invention. The data processing apparatus 5 has a single processor core 50 on which a secure process 20 is running in a secure domain and an untrusted process 10 is running in a non-secure domain. The processor has a single operating system 30 which runs both the secure and the non-secure processes. The secure process 20 and untrusted process 10 both issue display requests for displaying data to an interface 40. The interface 40 is described in more detail with respect to FIG. 3, but briefly interface 40 controls the security of the display elements of display 65. Thus, interface 40 controls what is stored in display buffer 60. Display buffer 60 stores an array of display elements corresponding to locations on display 65. In association with each display element is a security permission indication which indicates whether the data stored there is secured data or unsecured data. Thus, when the interface 40 receives a display request from secure process 20 or untrusted process 10, it accesses the existing display element of the location corresponding to that request in the display buffer and determines what the security indication for that location is. The interface then makes an appropriate decision, based on the identity of the requester and the existing security state of the location, as to whether to allow the updated display data in the request to be written to the display buffer. If the request is from the untrusted process 10, then the interface will typically reject requests to read or overwrite secure locations, while requests from the secure process 20 may read and write display locations of any security setting. It should be noted that in this embodiment, it is considered that display requests from secure process 20 are for displaying secure data. It may be in other embodiments that secure process 20 displays non-secure data as well as secure data. In such a case, there will be an indication along with the display request indicating the type of data that is to be stored and the security indication corresponding to the appropriate display element will be set accordingly.

Thus, interface 40 controls the storage of data that is to be displayed on the display 65 in the display buffer 60. It also controls the storage of the security status of each of the data elements in display buffer 60. Thus, display buffer 60 contains information not only of the data to be displayed, but also of each of the data elements' security status.

Information in display buffer 60 is displayed on display 65 using display controller 62. Display controller 62 may for example be a LCD controller. Display controller 62 interprets the information stored in display buffer 60 and sets the pixels or display elements in display 65 accordingly. Display controller 62 also receives an input from a secure user input 72. If this input has received an input from the user, then display controller 62 acts in response to this input to transform the data that it is displaying. It transforms the data in such a way that display elements that are secure are transformed differently to the display elements that are not secure. As each display element contains a security status indicating its security status, it is straightforward for the display controller to differentiate between display elements in this manner and transform them differently to each other.

In this way it becomes clear to a user which display elements are displaying secure data and which are displaying non-secure data. Thus, the information that is stored in display buffer 60 regarding the security status of each of the display elements can be displayed to a user.

As can be seen, there is a hardware link from secure user input 72 to the display controller 62 and thus, this input is completely isolated from the untrusted processes which makes it particularly secure.

In some embodiments there is an additional input from the secure user input 72 to a secure side of the processor 52. This can be used to disable non-secure access to the user interface 70 in response to a signal being received at secure user input 72. This acts as an additional security measure to enable the system to switch to a particularly secure mode in which non-secure parts of the system are isolated from the user interface and thus, no untrusted process can access information a user may input during this time.

Figure 2A:
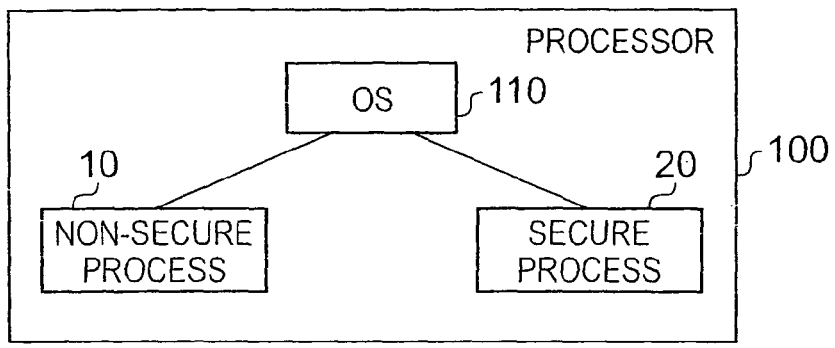
FIGS. 2A to 2C schematically illustrate how the non-secure process and secure process are arranged in different embodiments of the present invention.
Figure 2B:
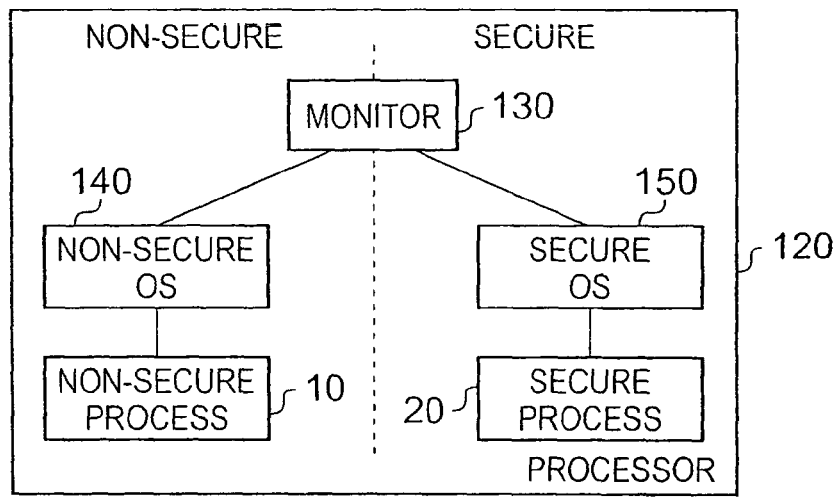
Figure 2C:
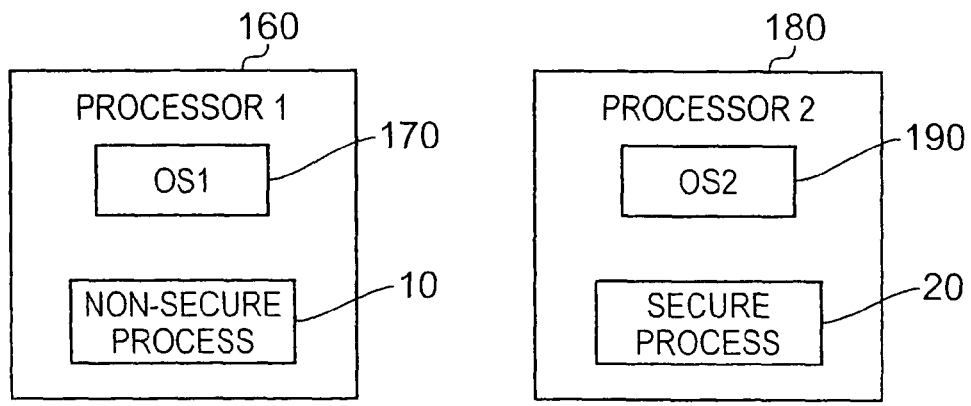

FIGS. 2A to 2C illustrate different ways in which the non-secure process 10 and the secure process 20 can be executed in accordance with different embodiments of the present invention. In accordance with FIG. 2A, both the non-secure process 10 and the secure process 20 are run by the same operating system 110 running on a processor 100. In such embodiments, the operating system 110 is considered to have sufficient security to ensure that the non-secure process 10 cannot issue an access request in a manner that makes it look like that access request is being issued by a secure process.

FIG. 2B schematically illustrates an alternative embodiment, in which various programs running on a processor 120 are run in either a secure domain or a non-secure domain. The system is provided with a monitor program 130 which executes at least partially in a monitor mode. The monitor program 130 is responsible for managing all changes between the secure domain and the non-secure domain in either direction. From a view external to the processor 120, the monitor mode is always secure and the monitor program is in secure memory.

Within the non-secure domain there is provided a non-secure operating system 140 and the non-secure process 10 is arranged to run on that non-secure operating system. In the secure domain, a secure operating system 150 is provided, and the secure process 20 is arranged to run on that secure operating system. In one embodiment, the secure operating system 150 is designed to provide only those functions which are essential to processing activities which must be provided in the secure domain, such that the secure operating system can be as small and simple as possible, since this encourages thorough design for security, thorough testing, and gives less volume of code which could have bugs.

In accordance with such an arrangement, the system does not rely on the operating system alone to provide the required level of security, and instead security is enforced at the hardware level. In particular, a signal is issued in association with each access request identifying whether that access request has been issued by a process executed in the secure domain, or a process executing in the non-secure domain. This signal is asserted at the hardware level and cannot be tampered with by the non-secure process. Indeed, in some embodiments, the presence of the secure domain is entirely hidden from applications executing in the non-secure domain.

The arrangement illustrated in FIG. 2B is that employed within ARM processors employing a TrustZone architecture, as developed by ARM Limited Cambridge, United Kingdom. More details of such a system are described for example in GB-A-2,396,034 and GB-A-2,396,713.

In an alternative embodiment illustrated in FIG. 2C, separate processors 160 and 180 are used to run the non-secure process 10 and the secure process 20, respectively. In particular, a first operating system 170 is provided on the first processor 160, and the non-secure process 10 runs on that operating system. In addition, a second operating system 190 is provided on the second processor 180, and the secure process 20 runs on that operating system.

Whilst in the above described embodiments, only a single non-secure process and a single secure process are shown, it will be appreciated that multiple non-secure processes and multiple secure processes may be running, and all or at least a subset of those processes may have access to the display buffer 60.

Irrespective of which approach is used, it is important to ensure that secure display elements produced by the secure process 20 and stored in the display buffer 60 cannot be tampered with by any non-secure process having access to the display buffer 60, taking into account the required security for such secure display elements, namely whether confidentiality, integrity, or both are required to be maintained.

Figure 3:
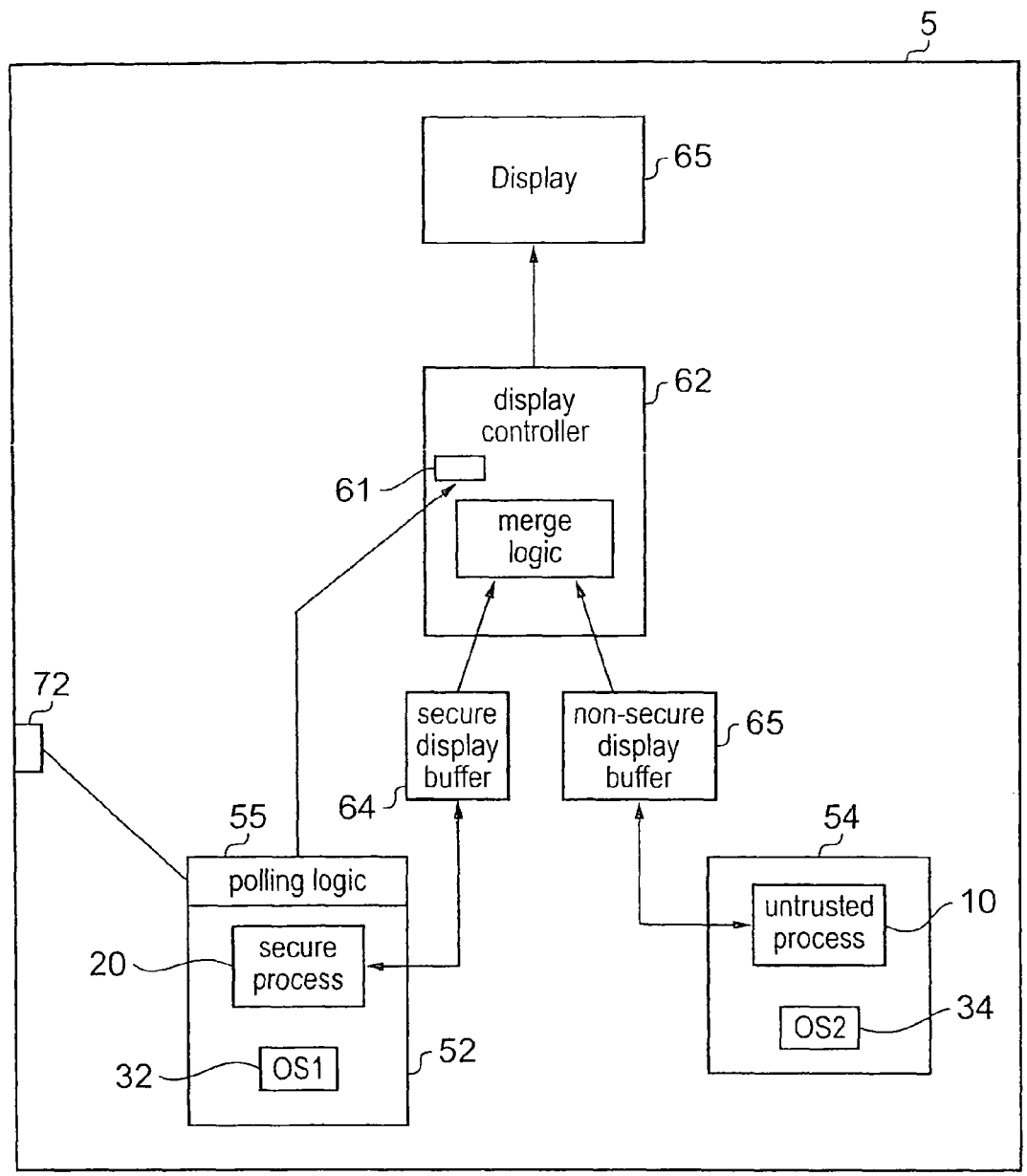
FIG. 3 is a block diagram illustrating a data processing apparatus in accordance with a further embodiment of the present invention.

FIG. 3 shows an alternative embodiment of a data processor 5 to that illustrated in FIG. 1. This embodiment has two processor cores 52 and 54 each with their own operating system 32 and 34, one of them 52 being a secure processor and running secure process 20, and the other 54 being a non-secure processor running untrusted process 10. In this embodiment, instead of having a single display buffer there are two display buffers, a secure display buffer 64 and a non-secure display buffer 65. Thus, in this embodiment secure data generated by the secure process 20 is stored in secure display buffer 64 while non-secure data generated by untrusted process 10 is stored in non-secure display buffer 65. The use of two display buffers rather than a single display buffer with interface logic and security indications provided for each display element is an alternative way of providing a mixed security screen. In this case, the output of the two display buffers is merged by logic within display controller 62. In this embodiment, display controller 62 also comprises a register 61 which stores a value indicative of whether or not there is an input received at secure user input 72. Thus, a secure user input 72 is not hard wired using hardware to display controller 62 rather it is polled using polling logic 55 on secure processor 52 which, when it detects a user input at secure user input 72, sets register 61 within display controller 62 to store a value indicative of this. Display controller 62 is responsive to the value stored in register 61 to either transform the display elements such that non-secure display elements are transformed differently to secure display elements or not transform them. This may include not displaying the data in the non-secure display buffer and only displaying the data in the secure display buffer.

Figure 4:
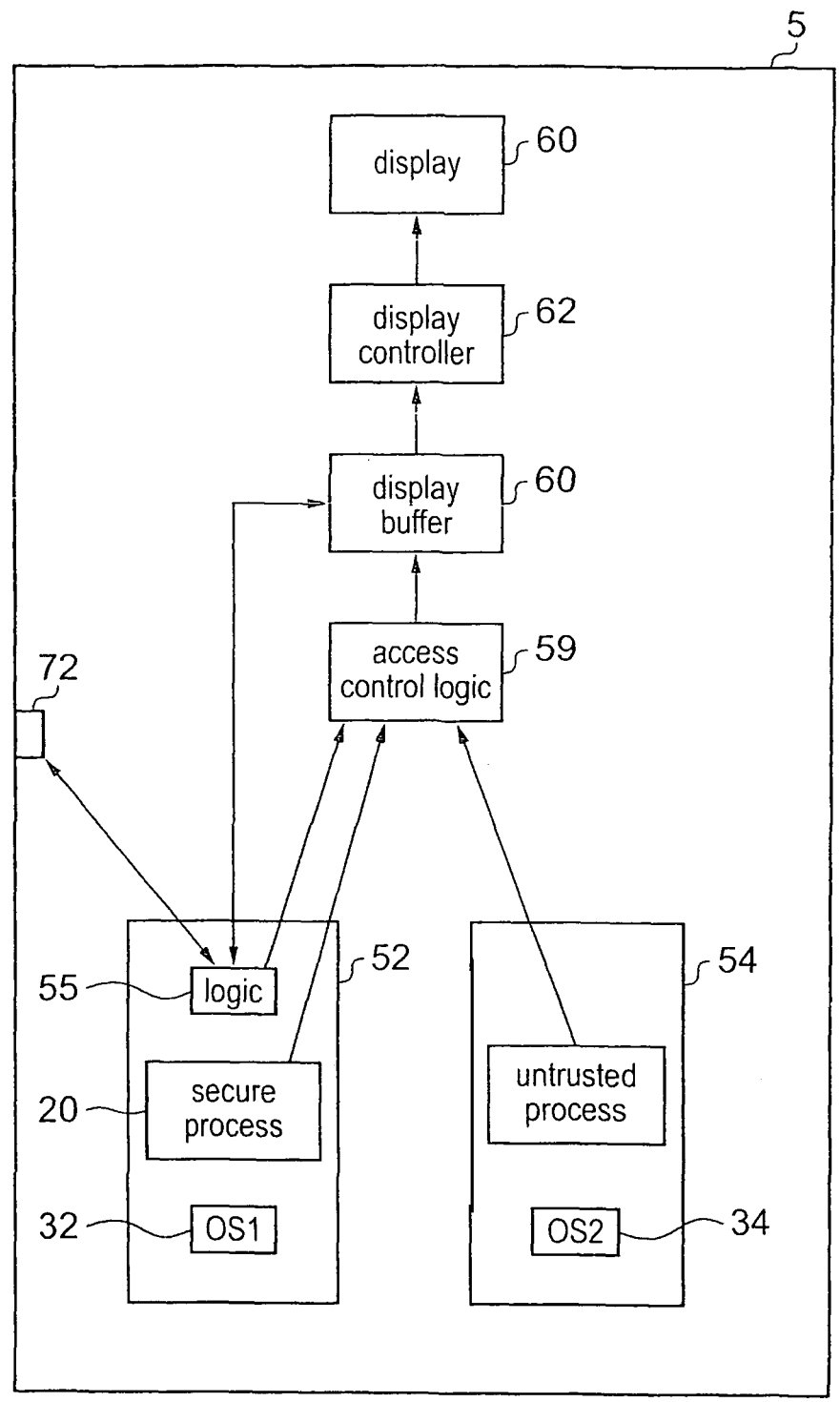
FIG. 4 is a block diagram showing a data processing apparatus having two cores and two display buffers according to an embodiment of the present invention.

FIG. 4 shows an alternative embodiment in which logic 55 on secure processor 52 not only polls secure user input 72 but also acts in response to detecting a user input to transform the data in the display buffer 60 itself. It does this by blocking non-secure access to the display buffer 60 in response to detecting a user input using access control logic 59 and then transforming the data itself such that secure and non-secure data are transformed differently. When a user input is no longer detected at secure user input 72 access control logic 59 allows secure access to the display buffer again.

Figure 5A:
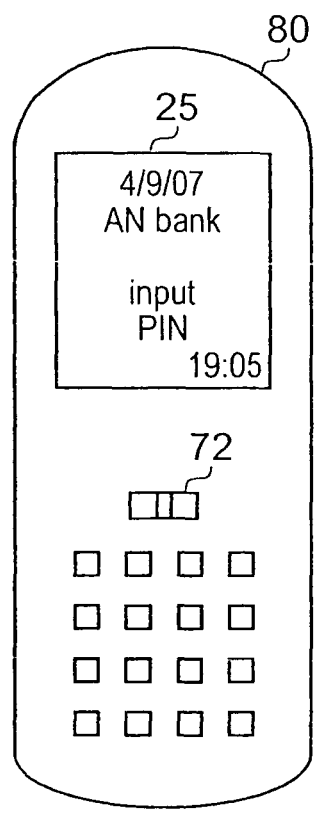
FIGS. 5A and 5B show mobile telephones on which an embodiment of the invention has been implemented.
Figure 5B:
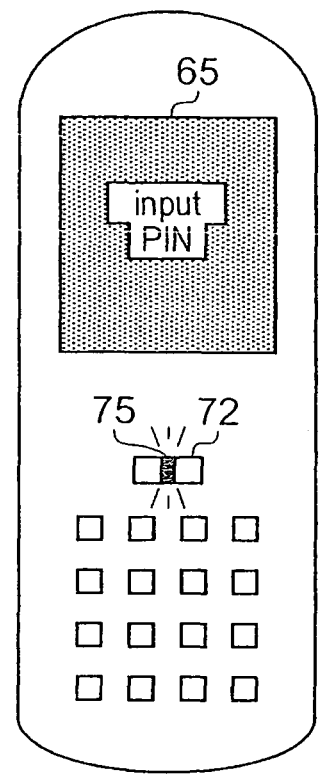

FIG. 5 shows an example of how an embodiment of the present invention would function. FIG. 5A shows a mobile phone 80 where the secure user input or security button 72 has not been pushed. Thus, display 65 is displaying both secure and non-secure data. FIG. 5B shows mobile phone 80 of FIG. 5A after secure user button 72 has been depressed. In this case, the non-secure data is transformed to be black while the secure data remains unchanged. Thus, a user will understand that the instruction "input pin" that is displayed is secure data and can be obeyed. Secure user input 72 comprises an LED 75 which lights when the button is depressed. This indicates to the user that they are indeed in secure display mode and that they can be confident that what they see is secure data.

Although in this embodiment, the non-secure pixels are set to black in response to the button 72 being pressed, it should be clear to a skilled person that other transformations could be used provided that secure and non-secure data are transformed differently. For example, the non-secure pixels could get blended towards black but not by 100% so that non-secure data is clearly non-secure but can still be read. This can be useful as the non-secure data may be required by a user. Alternatively, the secure window displaying secure data could get tinted green for example, while non-secure data could get tinted red.

Although in this embodiment the secure user input comprises security button 72, so that modification of the display is triggered by depression of the security button, it would be clear to a skilled person that in other embodiments modification of the display may be triggered in a different way. For example, there may be a soft button on the screen that acts as the secure user input. Alternatively, the secure user input may be applied by the user's voice, the apparatus having a near-field voice communication system that is used to securely identify the user by receiving the user's voice and comparing it to an archive in which the user speaking certain commands is stored.

Figure 6:
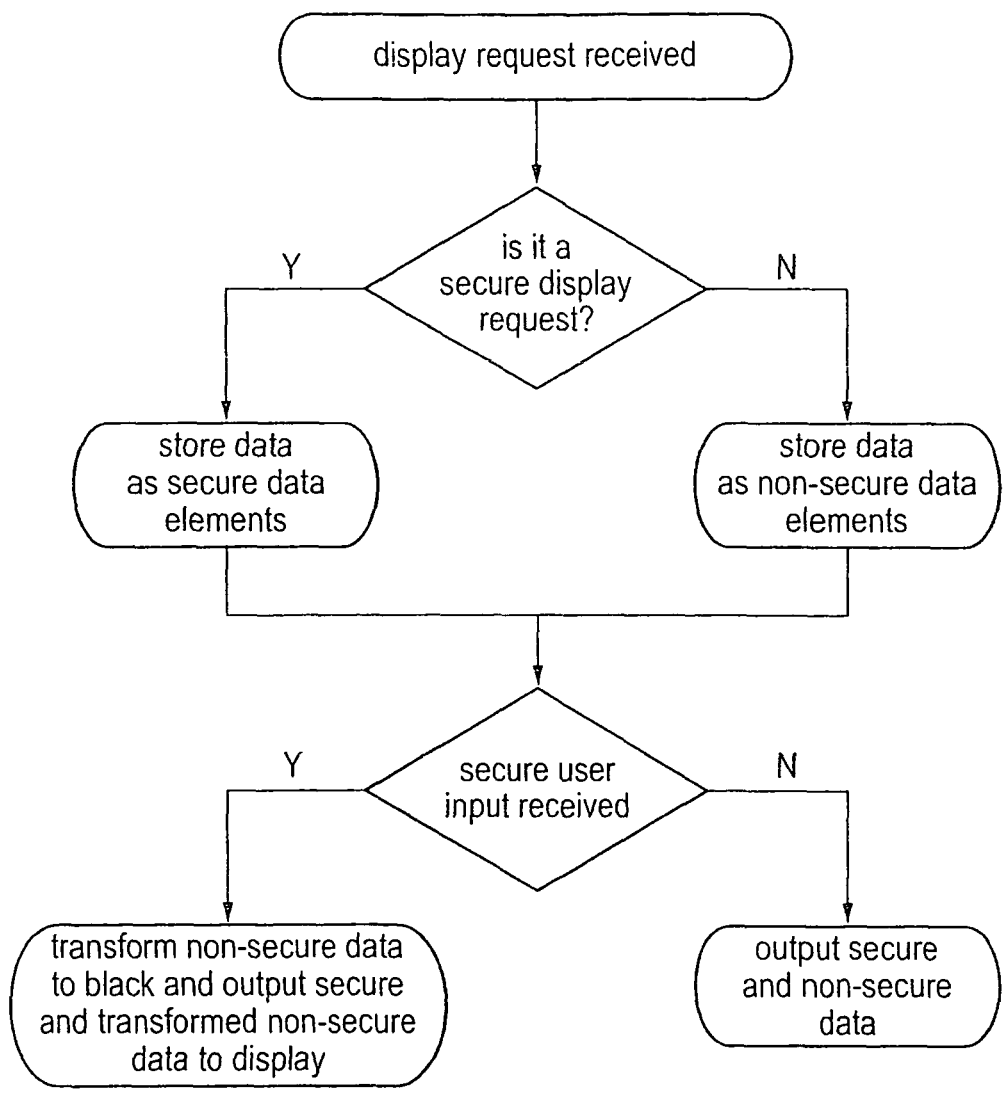
FIG. 6 shows a flow-diagram illustrating steps in a method according to an embodiment of the present invention.

FIG. 6 shows a flow diagram illustrating a method according to an embodiment of the present invention. In this method a display request is received at interface logic 40. First it is determined if the display request is secure or not. If it is secure, then the data is stored in the display buffer as a secure data element, while if it is not secure it is stored as a non-secure data element. The device then determines if a secure user input has been received. If it has, then the device acts to transform non-secure data to black and to output the secure and the transformed non-secure data to the display. If no input has been received at the secure user input, then the interface acts to output the secure and the non-secure data as they are.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
at least one processor;
a display for displaying data processed by said at least one processor;
at least one display buffer for storing an array of display elements for subsequent output to said display, said display elements being secure display elements for displaying secure data and non-secure display elements;
a display controller for controlling display of data output from said at least one display buffer;
a user interface, wherein said at least one processor is configured to execute at least one untrusted process and at least one secure process, said at least one secure process having access to secure data;
a secure user interface for receiving a user input, said data processing apparatus configured such that said user input received at said secure user interface is transmitted either via a hardware link to said display controller or via a hardware link to a secure processor configured to execute only secure processes wherein said received user input is not accessible to said at least one untrusted process; and
said data processing apparatus being responsive to an input received at said secure user interface to transform data to be displayed on said display such that said secure display elements and said non-secure display elements are transformed differently to each other.

2. A data processing apparatus according to claim 1, wherein said secure data is data that said at least one secure process has access to and that said at least one untrusted process cannot modify.

3. A data processing apparatus according to claim 2, wherein said secure data is data that said at least one secure process has access to and that is not accessible to said untrusted process.

4. A data processing apparatus according to claim 1, wherein said secure data is data generated by said at least one secure process.

5. A data processing apparatus according to claim 1, wherein
each of said display elements comprise a security permission indication associated therewith identifying whether that display element is a secure display element or a non-secure display element; said data processing apparatus further comprising:
display logic associated with said display buffer for receiving display requests from said secure and untrusted processes, said display logic being operable to determine and where appropriate modify said security permission indication associated with a display element currently stored at a location indicated by said received display requests in dependence upon said received display requests.

6. A data processing apparatus according to claim 1, said data processing apparatus comprising:
two display buffers, a secure display buffer for storing an array of secure display elements and a non-secure display buffer for storing an array of non-secure display elements; and
display logic for merging data from said two display buffers to form a frame for display on said display.

7. A data processing apparatus according to claim 6, said data processing apparatus being responsive to an input received at said secure user interface to output said secure display buffer and not to output said non-secure display buffer.

8. A data processing apparatus according to claim 1, wherein said display controller is a secure device that is not responsive to untrusted processes, said display controller being responsive to said input received at said secure user interface to transform display elements received from said at least one display buffer prior to displaying said display elements on said display such that said secure display elements and non-secure display elements are transformed differently to each other.

9. A data processing apparatus according to claim 1, wherein said data processing apparatus is responsive to said input received at said secure user interface to transform said non-secure display elements and not to transform said secure display elements.

10. A data processing apparatus according to claim 9, wherein said data processing apparatus is responsive to said input received at said secure user interface to transform said non-secure display elements to display black.

11. A data processing apparatus according to claim 1, wherein in response to said input received at said secure user interface said data processing apparatus denies access to said user interface to said at least one untrusted process.

12. A data processing apparatus according to claim 1, said data processing apparatus further comprising an indicator, said indicator being operable to indicate an input received at said secure user interface.

13. A data processing apparatus according to claim 1, wherein said secure user interface comprises a toggle button, an input being received at said secure user interface when said button is toggled one way and not being received when it is toggled the other way.

14. A data processing apparatus according to claim 1, further comprising a secure register and polling logic for polling said secure user interface, said polling logic setting a value in said secure register in response to detecting a received input, said data processing apparatus being responsive to said value in said secure register to transform data to be displayed on said display such that said secure data display elements and said non-secure display elements are transformed differently to each other.

15. A data processing apparatus according to claim 1, further comprising polling logic for polling said secure user interface, said polling logic being operable to transform data to be displayed on said display such that said secure data display elements and said non-secure display elements are transformed differently to each other in response to detecting a user input at said secure user interface.

16. A data processing apparatus according to claim 1, wherein said at least one processor is operable in a secure domain and a non-secure domain, said at least one processor being operable such that when executing a program in a secure domain said program has access to secure data which is not accessible when said processor is operating in a non-secure domain, wherein said secure process is a process executed in said secure domain, and said untrusted process is a process executed in a non-secure domain.

17. A data processing apparatus according to claim 1, wherein said at least one processor comprises a secure processor and a non-secure processor said secure processor being operable to process said at least one secure process and said non-secure processor being operable to process said at least one untrusted process.

18. A method of processing data comprising the steps of:
processing at least one untrusted process and outputting non-secure data for display to a display buffer;
processing at least one secure process and outputting data including at least some secure data for display to said display buffer;
storing said data received from said at least one secure process and said at least one untrusted process in said display buffer as an array of display elements for subsequent output to a display under control of a display controller, said display elements being secure display elements for displaying secure data and non-secure display elements for displaying non-secure data;
receiving a user input at a secure user interface and transmitting said user input either directly via a hardware link to said display controller or directly via a hardware link to a secure processor configured to execute only secure processes such that said user input is, not accessible to said at least one untrusted process; and
in response to said received user input, transforming data to be displayed on said display such that said secure data display elements and said non-secure display elements are transformed differently to each other.

19. A method according to claim 18, wherein said secure data is data that said at least one secure process has access to and that said at least one untrusted process cannot modify.

20. A method according to claim 19, wherein said secure data is data that said at least one secure process has access to and that is not accessible to said untrusted process.

21. A method according to claim 18, wherein said secure data is data generated by said at least one secure process.

22. A method according to claim 18, wherein in response to said input received at said secure user interface said method transforms said non-secure display elements and does not transform said secure display elements.

23. A method according to claim 22, wherein in response to said input received at said secure user interface said method transforms said non-secure display elements to display black.

24. A method according to claim 18, wherein in response to said input received at said secure user interface said method denies access to a user interface to said at least one untrusted process.

25. A method according to claim 18, comprising a further step of polling said secure user interface, and in response to detecting a user input setting a value in said secure register, said method being responsive to said value in said secure register to perform said step of transforming data to be displayed on said display such that said secure data display elements and said non-secure display elements are transformed differently to each other.

* * * * *